(No Model.)
S. A. HOLT.
DRAFT EQUALIZER.
No. 510,971. Patented Dec. 19, 1893.
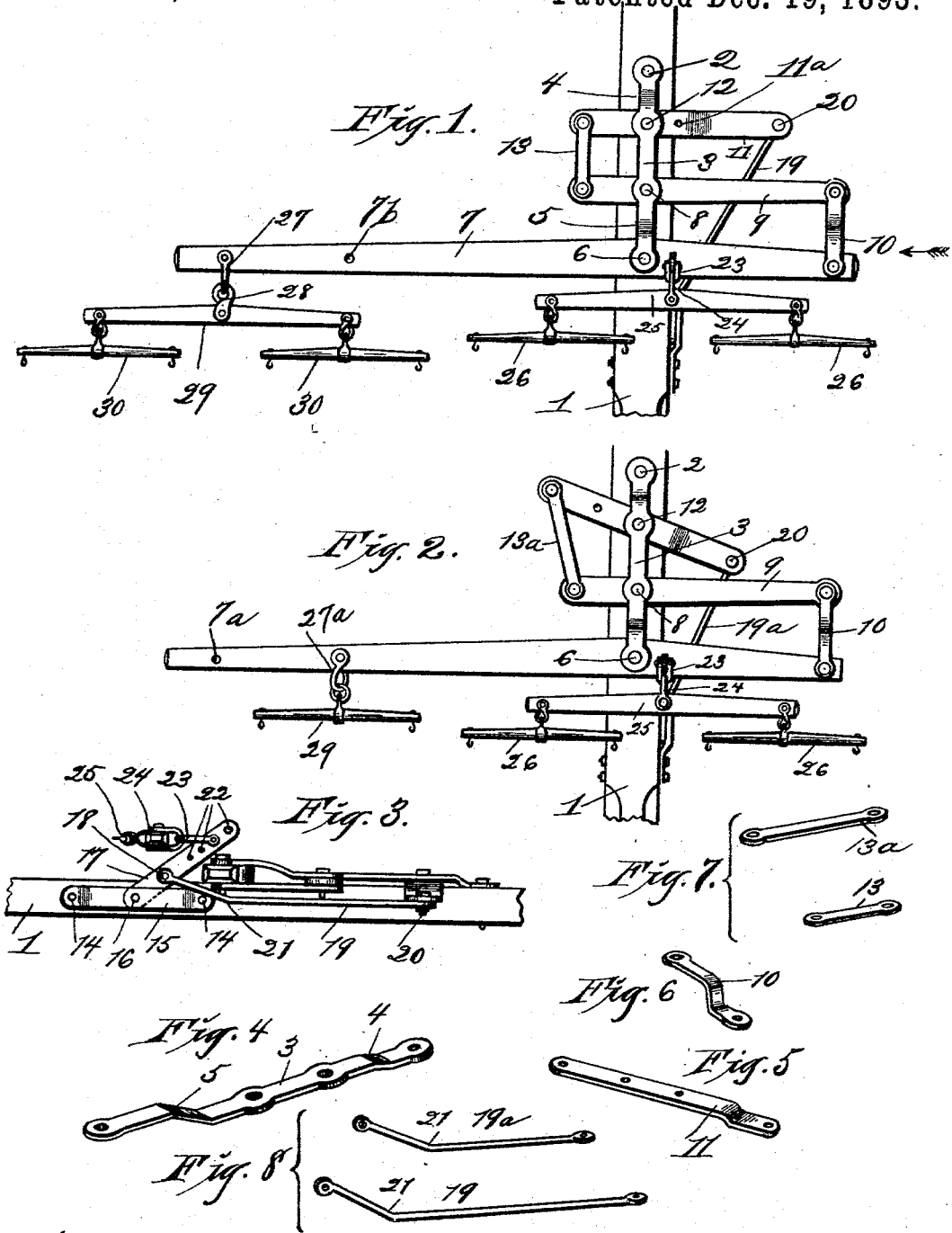

UNITED STATES PATENT OFFICE.

SAMUEL A. HOLT, OF SALEMSBURG, KANSAS.

DRAFT-EQUALIZER.

SPECIFICATION forming part of Letters Patent No. 510,971, dated December 19, 1893.

Application filed May 12, 1893. Serial No. 473,940. (No model.)

*To all whom it may concern:*

Be it known that I, SAMUEL A. HOLT, of Salemsburg, Saline county, Kansas, have invented certain new and useful Improvements in Draft-Equalizers, of which the following is a full, clear, and exact description, reference being had to the accompanying drawings, forming a part hereof.

My invention relates to improvements in draft-equalizers or eveners; and the objects of my invention are to produce an evener which can quickly and easily be transformed from a four-horse to a three-horse evener, or from a three-horse to a four-horse evener; which effectually equalizes the work of all the draft-animals; and to provide an equalizer by which the strain can be proportionately divided among three or four draft-animals; furthermore to provide a draft-equalizer which is simple, strong, durable and inexpensive of construction.

To the above purposes my invention consists in certain peculiar and novel features of construction and arrangement of parts, as will be hereinafter described and claimed.

In order that my invention may be fully understood, I will proceed to describe it with reference to the accompanying drawings, in which—

Figure 1, is a top plan view of a draft-equalizer constructed in accordance with my invention, and arranged in this instance as a four horse evener. Fig. 2, is a top plan view of a draft-equalizer constructed in accordance with my invention, and arranged for use as a three-horse evener. Fig. 3, is a side elevation or edge view looking in the direction of the arrow, Fig. 1. Fig. 4, is a detail perspective view of the bearing-plate to which certain parts of the device are pivotally connected. Fig. 5, is a detail perspective view of the adjustable lever adapted to be pivotally connected to the bearing-plate. Fig. 6, is a detail perspective view of a link adapted to pivotally connect one of the levers with the equalizing-beam. Fig. 7, represents a detail perspective view of two links, adapted for use when the equalizer is arranged as a four-horse or a three-horse evener, and Fig. 8, is a detail perspective view of two link rods also adapted for use when the equalizer is arranged as a four-horse or a three-horse evener.

In the drawings, 1 designates the draft-beam. Arranged longitudinally of and upon the draft-beam, and secured at its rear end upon the vertical bolt 2, is a bearing-plate 3, which is bent upwardly at 4 near its rear end and then horizontally so as to form a space between the upper side of the draft-beam and the under side of the bearing-plate, and is then bent upwardly at 5 near its front end so as to form a greater space between the under side thereof and the upper side of the draft-beam, and pivoted at a point about one-third of its length upon the bolt 6 is an equalizing-beam 7, which extends transversely of and projects beyond each side of the draft-beam.

Pivoted upon the vertical bolt 8 passing through the bearing-plate 3 and the draft-beam 1, and extending transversely thereof and rearward of the equalizing-beam 7, is a lever 9; said lever being pivoted nearer one end than the other, and arranged so that the longer end shall project in the same direction as the short end of the equalizing-beam 7, to which it is pivotally connected by the link-bars 10. A second lever 11 is pivoted between the bearing-plate 3 and the draft-beam 1 upon the vertical bolt 12 nearer one end than the other and rearward of the first mentioned lever, and arranged so that the longer end thereof will project in the same direction as the longer end of the first mentioned lever. The shorter ends of these levers are pivotally connected together by link bars 13.

Secured upon bolts 14 to the side of the draft-beam, and slightly in advance or forward of the equalizing-beam 7, is a bearing-plate 15, which is arranged so as to form a space between said plate and the adjacent side of the draft-beam, and pivoted upon the horizontal bolt 16 within said space is the lower end of a lever 17, which extends in its normal position upwardly and rearwardly as shown. Pivoted at 18 to said lever is the front end of the link or connecting rod 19, the rear end of which is pivotally connected by the bolt 20 to the outer end of the lever 11; said connecting rod or link being bent at 21 so as to clear and not contact with the equalizing-beam 7 when in operation, as shown more particularly in Fig. 3. The lever 17 is further formed with a series of holes or apertures 22, to one of which is adapted to be pivotally connected a link 23, connected in turn to the clevis 24 of the double-tree 25, which carries at its outer ends and in the usual manner the single-trees 26. The longer arm of the equalizing-beam 7 is formed with a vertical opening $7^a$ near its outer end through which a bolt is passed to pivotally carry a link 27, and connected in turn in the usual manner to this link 27 is the clevis 28 of a double-tree 29, which carries in the usual manner at its outer ends single-trees 30. An equalizer thus constructed is for use with four draft-animals, one being connected up in the usual manner with each single-tree, and it will be seen should the team connected to the outer end of the equalizing-beam pull too strongly for a team connected to the lever 17, by adjusting the link 23 toward the outer end of the said lever the strain may be equalized, and the team connected to said lever will obtain an increased leverage which operates to counteract the strain upon the outer end of the equalizing-beam through the medium of the link rod and bar connections and the equalizing levers 9 and 11. Should the pulling strain of the inner pair of horses or animals be too great, by adjusting the link 23 inward toward the pivotal point of the lever 17, the leverage power of the animals connected to the lever 17 is decreased, while the leverage of the animals connected to the outer end of the equalizing-beam is inclosed in a proportionate ratio.

When it is desired to use the equalizer as a three-horse evener, the double-tree 29 is disconnected from the outer end of the equalizing-beam, and the link $27^a$ is pivotally connected to a bolt passing through the vertical opening $7^b$ formed through said equalizing-beam a suitable distance inward of the opening $7^a$, and a single-tree 30 is attached to said link $27^a$. To further equalize the leverage power, it is preferable to disconnect the link rod 19 and replace it with a similar but shorter rod $19^a$, and to disengage the link bar 13 and replace it with a longer link bar $13^a$, as shown in Fig. 2, this arrangement being such that the leverage or pull of the horses or draft-animals attached to the lever 17 is shortened, and to further equalize this power, the bolt 12 upon which the lever 11 is pivotally mounted is passed through an opening $11^a$ about the middle of said lever, as shown also in Fig. 2. With this arrangement all the power may be adjusted by moving the link 23 so that it will be pivotally connected farther inward or outward of the lever 17, accordingly as the strain is too great or too little, on the draft-animals attached to said lever 17. With this arrangement also, it will be seen that when attached to a plow or other implement where the earth is very hard and more than two animals are necessary, by having only one horse or draft-animal at one side of the draft-beam the earth may be plowed or harrowed very near to a fence or wall.

From this description, it will be seen that I have produced a draft-equalizer which is simple, strong, durable and inexpensive of construction; which thoroughly equalizes the pulling strain upon each animal and which may readily be converted or reconverted from a three-horse evener to a four-horse evener.

Having thus described my invention, what I claim as new, and desire to secure by Letters Patent, is—

1. A draft-equalizer, comprising a draft-beam, an equalizing-beam pivoted thereon so as to extend farther to one side than the other, a double-tree pivotally carried at the outer end of the equalizing-beam, and an equalizing-lever pivoted to the draft-beam in rear of the equalizing-beam and arranged so as to have its longer end projecting to the same side of the draft-beam as the short end of the equalizing-beam, and a link-bar pivotally connecting the long end of the lever and the short end of the equalizing-beam, and a second lever pivoted upon the draft-beam in rear of the first mentioned lever, and pivotally connected at one end to the short end of the first mentioned lever, and a lever pivoted to the side of the draft-beam in front of the equalizing-beam, and a link-rod pivotally connecting said lever and the rear equalizing-lever, and a double-tree pivotally connected to the upper end of the lever pivoted at the side of the draft-beam, substantially as set forth.

2. A draft-equalizer, comprising a draft-beam, an equalizing-beam pivoted thereto so as to extend farther to one side than the other, a single-tree pivotally carried a suitable distance from the outer end of the equalizing-beam, a lever pivoted to the draft-beam in rear of the equalizing-beam and arranged so as to have its longer end projecting to the same side of the draft-beam as the short end of the equalizing-beam and pivotally connected thereto, a second equalizing-lever pivotally connected at its middle to the draft-beam and in rear of the first mentioned equalizing-lever, and a link-bar connecting one end of said lever with the short end of the first mentioned equalizing-lever, a lever pivoted to the side of the draft-beam in front of the equalizing-beam, and having a series of holes or apertures, a double-tree carrying a link adapted to be pivotally connected to one or the other of said holes or apertures, and a link-rod pivotally connecting the free end of the rear or last mentioned-lever and the lever carried at the front side of the draft-beam, substantially as set forth.

In testimony whereof I affix my signature in the presence of two witnesses.

SAMUEL A. HOLT.

Witnesses:
E. M. ANDERSON,
T. KINGMAN.